United States Patent
Li et al.

(10) Patent No.: US 11,369,942 B2
(45) Date of Patent: Jun. 28, 2022

(54) METHOD FOR ASSEMBLING AND SYNTHESIZING $CU_2O$ PARTICLE-SUPPORTED POROUS CUBTC

(71) Applicant: Tongji University, Shanghai (CN)

(72) Inventors: Fengting Li, Shanghai (CN); Ying Wang, Shanghai (CN); Tao Feng, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 152 days.

(21) Appl. No.: 16/923,101

(22) Filed: Jul. 8, 2020

(65) Prior Publication Data
US 2021/0178362 A1    Jun. 17, 2021

(30) Foreign Application Priority Data

Dec. 12, 2019    (CN) .......................... 201911271764.3

(51) Int. Cl.
*B01J 20/22*    (2006.01)
*B01J 20/06*    (2006.01)
*B01J 20/30*    (2006.01)

(52) U.S. Cl.
CPC ............ *B01J 20/226* (2013.01); *B01J 20/06* (2013.01); *B01J 20/3064* (2013.01); *B01J 20/3078* (2013.01); *B01J 2220/46* (2013.01)

(58) Field of Classification Search
None
See application file for complete search history.

(56) References Cited

FOREIGN PATENT DOCUMENTS

| CN | 104857988 A | * | 8/2015 | ............. B01J 31/22 |
| CN | 104892518 A | * | 9/2015 | ............. B01D 53/02 |

* cited by examiner

*Primary Examiner* — Daniel Berns
(74) *Attorney, Agent, or Firm* — Bayramoglu Law Offices LLC

(57) ABSTRACT

A method for assembling and synthesizing $Cu_2O$ particle-supported porous CuBTC includes the following steps of: 1) dissolving polyvinylpyrrolidone (PVP) in ethanol solution to obtain a PVP-ethanol solution; 2) dissolving copper salt in distilled water, and mixing with trimesic acid, salicylic acid, and the PVP-ethanol solution obtained in step 1) under stirring; and 3) conducting a hydrothermal reaction on the mixed solution obtained in step 2) at 120° C. to obtain $Cu_2O$ particle-supported porous CuBTC. The new method introduces salicylic acid during the synthesis of CuBTC. The salicylic acid, as a ligand precursor, forms a porous CuBTC material through the unsaturated coordination of a ligand under the catalysis of Cu ion. The resulting porous CuBTC supported with ultrafine $Cu_2O$ nanoparticles can adsorb high-energy molecules and exhibit excellent crystallinity, porosity, and stability.

20 Claims, 2 Drawing Sheets

METHOD FOR ASSEMBLING AND SYNTHESIZING CU₂O PARTICLE-SUPPORTED POROUS CUBTC

CROSS REFERENCE TO THE RELATED APPLICATIONS

This application is based upon and claims priority to Chinese Patent Application No. 201911271764.3, filed on Dec. 12, 2019, the entire contents of which are incorporated herein by reference.

TECHNICAL FIELD

The present invention relates to the field of nano-material synthesis, and in particular to a method for assembling and synthesizing a $Cu_2O$ particle-supported porous copper benzene-1,3,5-tricarboxylate (CuBTC).

BACKGROUND

Metal-organic-frameworks (MOFs) are a novel group of porous crystalline structures, which have attracted wide attention in recent years. MOFs are characterized by a large surface area, a controllable pore size and shape, adjustable porosity and surface function. MOFs have broad application in adsorption reactions. Thus far, copper-based MOFs have attracted the most attention for their use as novel adsorbents. For example, CuBTC, with $Cu_3(BTC)_2$ as a formula unit, is a well-known MOF with high surface area and pore volume. CuBTC is especially suitable for some processes, e.g., gas storage, separation, catalysis, and adsorption due to its excellent properties. As a formula unit, CuBTC has been widely used for its adsorption capacity. There are only two types of cage structures, however: tetrahedral side pocket (about 5 Å in diameter, with 3.5 Å windows) and larger square cavity (9×9 Å), both of which interrupt diffusion of relatively large molecules. Therefore, to improve mass transfer performance, it is necessary to increase the pore size and maintain the microporous structure to obtain a larger specific surface area.

Considerable research focuses on achieving meso-porous, e.g., by direct synthesis, by ligand extension, by post-treatment, and by template. These methods, however, have several drawbacks. In the ligand extension method, for example, ligands are usually expensive and difficult to synthesize.

In the post-treatment method and the template method, the post-treatment may involve arduous and lengthy processes. When synthesis of MOFs done in situ, templates are usually incorporated into frameworks randomly. Although removing templates or other molecules may produce meso-pores in MOFs, the meso-pores tend to cause either partial or complete framework collapse leading to decreased crystallinity, low porosity and poor stability. In this regard, integration of novel and conventional ligands into an MOFs appears to provide promise. As a defective ligand, the ligand can be introduced into an MOF crystal during synthesis, which produces coordinatively unsaturated metal sites and functional meso-pores. This method has the limitation, however, that the enlarged pore size still exposes an insufficient number of active sites.

Exposing more active sites typically has an important effect on adsorption properties of adsorbents. It has been shown that $Cu_2O$ may strongly bind to pollutants, for example, through sigma bonds and n-n interactions. Evaluating the adsorption property of $Cu_2O$-modified activated carbon (AC), therefore, it was found that the adsorption property decreased gradually when the amount of $Cu_2O$ coated on the AC was increased. This quantitative inverse relationship is caused by steric hindrance and nanoparticle size. Therefore, it is desirable to provide a well-exposed active site with adjustable porosity.

SUMMARY

To overcome the above defects, the present invention provides a method for synthesizing a $Cu_2O$ particle-supported porous CuBTC with adjustable pore size distribution that exhibits constant crystallinity and morphology of the layered porous cube.

The present invention provides the following technical solution: a method for assembling and synthesizing a $Cu_2O$ particle-supported porous CuBTC, including the following steps of:

1) dissolving 1.4-1.6 g of polyvinylpyrrolidone (PVP) in ethanol solution to obtain a PVP-ethanol solution;

2) dissolving 2.1-2.2 g of copper salt in distilled water, and mixing with 0.6-0.7 g of trimesic acid, 0-0.9 g of salicylic acid, and the PVP-ethanol solution obtained in step 1) under stirring;

3) conducting a hydrothermal reaction on the mixed solution obtained in step 2) at 120° C. to obtain $Cu_2O$ particle-supported porous CuBTC.

Further, in the hydrothermal reaction in step 3), 0.5-1.5 g of citric acid is dissolved in distilled water to obtain 0.5-1.5 M citric acid solution. The citric acid solution is mixed with the mixtures obtained in steps 1) and 2) under stirring for 0.5-1 h, and then transferred into a 100 ml hydrothermal reactor. The hydrothermal reactor is sealed and placed in an oven for the hydrothermal reaction at 120° C.

Further, in the hydrothermal reaction in step 3), 1-2 g of tartaric acid is dissolved in distilled water to obtain 1-2 M tartaric acid solution. The tartaric acid solution is mixed with the mixtures obtained in steps 1) and 2) under stirring for 0.5-1 h, and then transferred into a 100 ml hydrothermal reactor; the hydrothermal reactor is sealed and placed in an oven for the hydrothermal reaction at 120° C.

Further, a mass of the salicylic acid is 0.4-0.5 g.

Further, the mass of the salicylic acid is 0.7-0.8 g.

Further, the mass of the salicylic acid is 0.8-0.9 g.

Further, the copper salt is $Cu(NO_3)_2 \cdot 3H_2O$.

Further, a molar ratio of the ethanol solution in step 1) to the distilled water in step 2) is 1:1.

Further, both the ethanol solution in step 1) and the distilled water in step 2) are 30 ml in volume.

Further, the hydrothermal reaction in step 3) lasts for 12 h.

The present invention has the following advantages: 1) The method for assembling and synthesizing a $Cu_2O$ particle-supported porous CuBTC provided by the present invention needs no template or complexing agent and is easy to operate. Moreover, because neither template nor complexing agent is used, meso-pores produced by the method will not lead to framework collapse caused by incorporation of the template or complexing agent into a framework, thereby improving the crystallinity, porosity, and stability of the synthesized $Cu_2O$ particle-supported porous CuBTC.

2) The present invention introduces salicylic acid during the synthesis of CuBTC. The salicylic acid, as a ligand precursor, forms a new ligand under the catalysis of Cu ion at a certain temperature. The new ligand lacks an active coordination site relative to trimesic acid, and a porous CuBTC material is formed through the unsaturated coordination of the ligand. Meanwhile, during the generation of the new ligand, a certain number of reducing substances are produced, which catalyzes the reduction of a Cu cluster to a $Cu_2O$ nano-material in the presence of oxygen.

3) The method for synthesizing the $Cu_2O$ particle-supported porous CuBTC provided by the present invention is green, mild, simple, and feasible; not only does the method for assembling and synthesizing a ligand produce a hierarchical porous structure, but also maintains basically the same morphology and crystallinity. Particularly, the resulting porous CuBTC framework is supported with ultrafine $Cu_2O$ nanoparticles. The composite produced thereby, i.e., $Cu_2O$ particle-supported porous CuBTC, can adsorb high-energy molecules.

4) Addition of citric acid or tartaric acid as auxiliary acidifier in the hydrothermal reaction plays a guiding role in the growth of the synthesized porous $Cu_2O$ particle-supported porous CuBTC. The $Cu_2O$ particle-supported porous CuBTC synthesized by auxiliary acidifier-assisted hydrothermal reaction has a better heterogeneous spatial phase, a smaller molecular volume and steric hindrance, and reacts with $Cu_2O$ in the space network structure of the $Cu_2O$ particle-supported porous CuBTC more easily, to obtain a $Cu_2O$ particle-supported porous CuBTC with better performance with the aid of the auxiliary acidifier.

BRIEF DESCRIPTION OF THE DRAWINGS

The present invention will be described below in more detail with reference to the examples and the drawings. Particularly.

DETAILED DESCRIPTION

Figure 1:
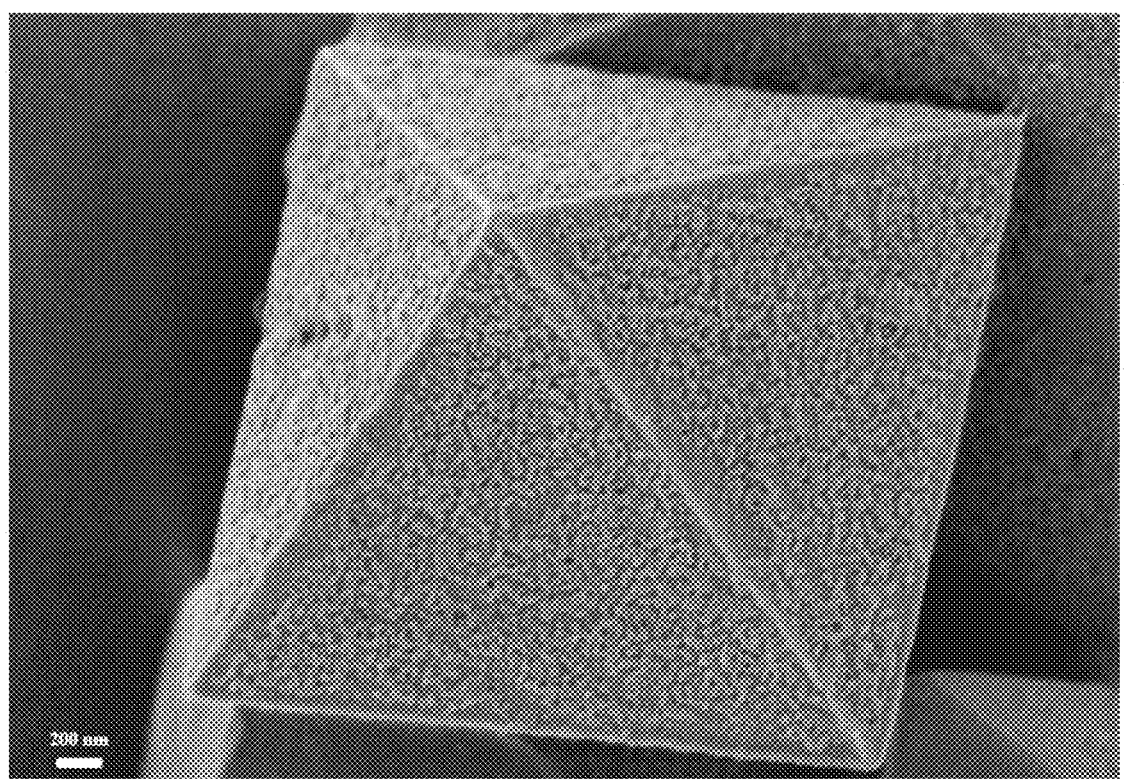
FIG. 1 is a scanning electron micrograph of the $Cu_2O$ particle-supported porous CuBTC synthesized by the synthetic method provided by the present invention.

Taken in conjunction with the accompanying drawings, the following paragraphs describe the technical solutions in exemplary embodiments of the present invention. The described examples are merely a part rather than all of the examples of the present invention. All other examples obtained by a person of ordinary skill in the art based on the examples of the present invention without creative efforts shall fall within the protection scope of the present invention.

Example 1

A method for assembling and synthesizing a $Cu_2O$ particle-supported porous CuBTC of this example includes the following steps.

1) 1.4 g of polyvinylpyrrolidone (PVP) was dissolved in 30 ml of ethanol solution to obtain a PVP-ethanol solution.

2) 2.1 g of $Cu(NO_3)_2 \cdot 3H_2O$ was dissolved in 30 ml of distilled water, and mixed with 0.6 g of trimesic acid, 0 g of salicylic acid, and the PVP-ethanol solution obtained in step 1) under stirring.

3) A hydrothermal reaction was conducted on the mixed solution obtained in step 2) at 120° C. for 12 h. Specifically, in the hydrothermal reaction, 0.5 g of citric acid was dissolved in distilled water to obtain 0.5 M citric acid solution. The citric acid solution was mixed with the mixtures obtained in steps 1) and 2) under stirring for 0.5 h, and then transferred into a 100 ml hydrothermal reactor; the hydrothermal reactor was sealed and placed in an oven for the hydrothermal reaction at 120° C., to obtain $Cu_2O$ particle-supported porous CuBTC.

Example 2

This example differs from Example 1 only in that: in the hydrothermal reaction, 1 g of citric acid was dissolved in distilled water to obtain 1 M citric acid solution. The above citric acid solution was mixed with the mixtures obtained in steps 1) and 2) under stirring for 0.8 h, and then transferred into a 100 ml hydrothermal reactor. The hydrothermal reactor was sealed and placed in an oven for the hydrothermal reaction at 120° C.

Example 3

This example differs from Example 1 and 2 only in that: in the hydrothermal reaction, 1.5 g of citric acid was dissolved in distilled water to obtain 1.5 M citric acid solution. The above citric acid solution was mixed with the mixtures obtained in steps 1) and 2) under stirring for 1 h, and then transferred into a 100 ml hydrothermal reactor; the hydrothermal reactor was sealed and placed in an oven for the hydrothermal reaction at 120° C.

Example 4

A method for assembling and synthesizing a $Cu_2O$ particle-supported porous CuBTC of this example includes the following steps.

1) 1.45 g of PVP was dissolved in 30 ml of ethanol solution to obtain a PVP-ethanol solution.

2) 2.13 g of $Cu(NO_3)_2 \cdot 3H_2O$ was dissolved in 30 ml of distilled water, and mixed with 0.635 g of trimesic acid, 0.45 g of salicylic acid, and the PVP-ethanol solution obtained in step 1) under stirring.

3) A hydrothermal reaction was conducted on the mixed solution obtained in step 2) at 120° C. for 12 h. Specifically, in the hydrothermal reaction, 1 g of tartaric acid was dissolved in distilled water to obtain 1 M tartaric acid solution. The above tartaric acid solution was mixed with the mixtures obtained in steps 1) and 2) under stirring for 0.5 h, and then transferred into a 100 ml hydrothermal reactor. The hydrothermal reactor was sealed and placed in an oven for the hydrothermal reaction at 120° C., to obtain $Cu_2O$ particle-supported porous CuBTC (1).

Example 5

This example differs from Example 4 only in that: in the hydrothermal reaction, 1.5 g of tartaric acid was dissolved in distilled water to obtain 1.5 M tartaric acid solution. The above tartaric acid solution was mixed with the mixtures obtained in steps 1) and 2) under stirring for 0.8 h, and then transferred into a 100 ml hydrothermal reactor. The hydrothermal reactor was sealed and placed in an oven for the hydrothermal reaction at 120° C.

Example 6

This example differs from Example 4 and 5 only in that: in the hydrothermal reaction, 2 g of tartaric acid was dissolved in distilled water to obtain 2 M tartaric acid solution. The above tartaric acid solution was mixed with the mixtures obtained in steps 1) and 2) under stirring for 0.5-1 h, and then transferred into a 100 ml hydrothermal reactor. The hydrothermal reactor was sealed and placed in an oven for the hydrothermal reaction at 120° C.

Example 7

A method for assembling and synthesizing a $Cu_2O$ particle-supported porous CuBTC of this example includes the following steps.
1) 1.55 g of PVP was dissolved in 30 ml of ethanol solution to obtain a PVP-ethanol solution.
2) 2.17 g of $Cu(NO_3)_2.3H_2O$ was dissolved in 30 ml of distilled water, and mixed with 0.675 g of trimesic acid, 0.65 g of salicylic acid, and the PVP-ethanol solution obtained in step 1) under stirring.
3) A hydrothermal reaction was conducted on the mixed solution obtained in step 2) at 120° C. for 12 h to obtain $Cu_2O$ particle-supported porous CuBTC (1.5), and a scanning electron micrograph thereof is shown in FIG. 1.

Example 8

A method for assembling and synthesizing a $Cu_2O$ particle-supported porous CuBTC of this example includes the following steps.
1) 1.6 g of PVP was dissolved in 30 ml of ethanol solution to obtain a PVP-ethanol solution.
2) 2.2 g of $Cu(NO_3)_2.3H_2O$ was dissolved in 30 ml of distilled water, and mixed with 0.7 g of trimesic acid, 0.85 g of salicylic acid, and the PVP-ethanol solution obtained in step 1) under stirring.
3) A hydrothermal reaction was conducted on the mixed solution obtained in step 2) at 120° C. for 12 h to obtain $Cu_2O$ particle-supported porous CuBTC (2).

Test Example

Nitrogen adsorption-desorption isotherms, pore size distributions, and XRD patterns were tested for the $Cu_2O$ particle-supported porous CuBTC obtained in Examples 1, 4, 7, and 8 of the present invention. The results are shown in FIGS. 2 to 4.

Figure 2:
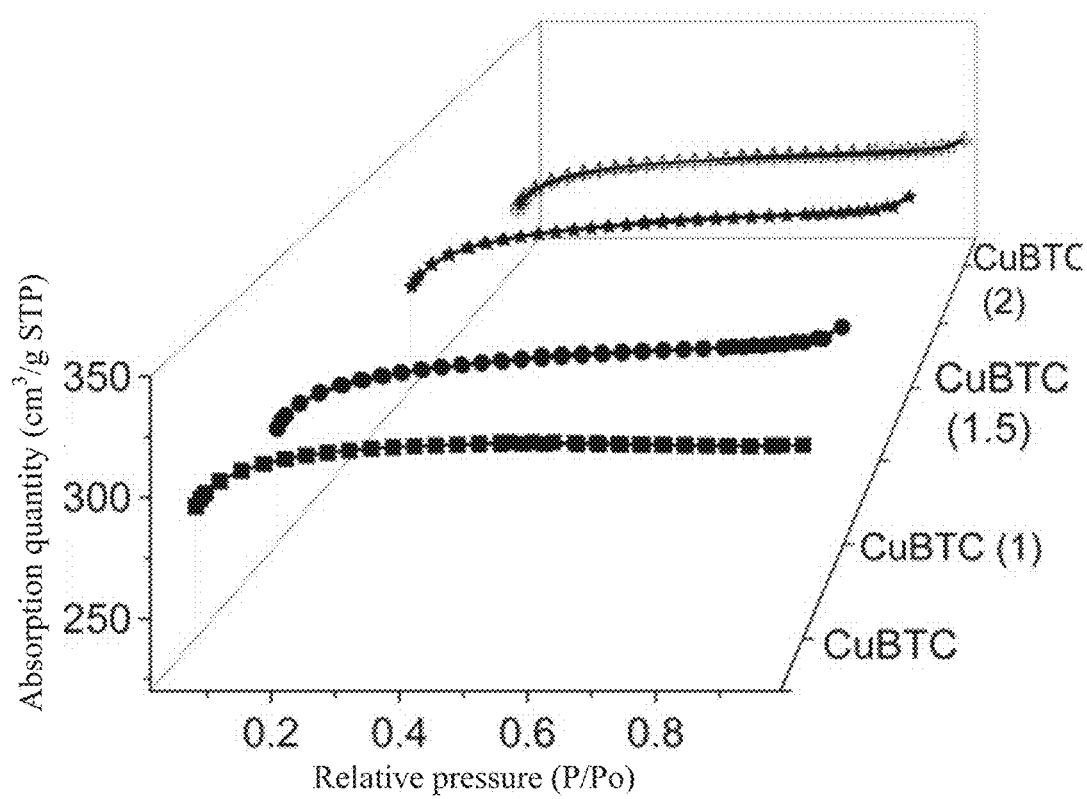
FIG. 2 illustrates nitrogen adsorption-desorption isotherms of the $Cu_2O$ particle-supported porous CuBTC with different meso-pore sizes synthesized in Examples 1, 4, 7, and 8 of the present invention.

From FIG. 2, as salicylic acid increases, adsorption-desorption isotherms of the $Cu_2O$ particle-supported porous CuBTC synthesized in all examples transit from microporous pattern to mesoporous pattern gradually. This suggests that as salicylic acid increases, micropores of the synthesized $Cu_2O$ particle-supported porous CuBTC are partly lost, more mesopores are produced, but there is no significant decrease in specific surface area.

Figure 3:
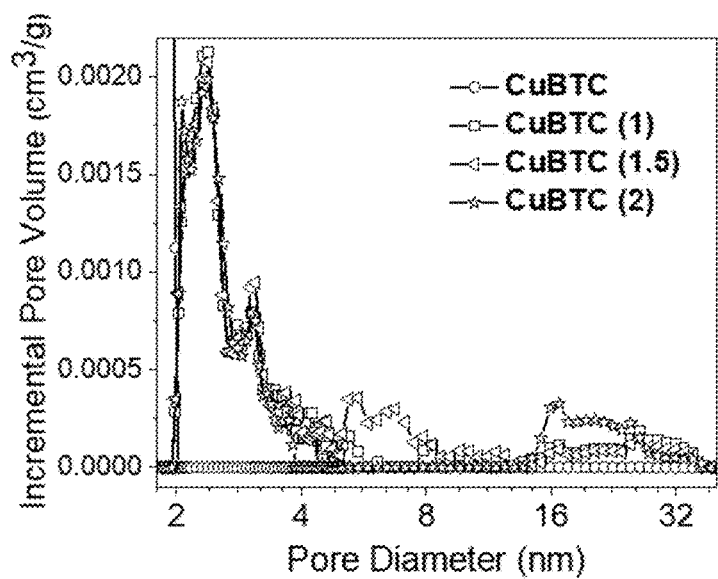
FIG. 3 illustrates pore size distributions of the $Cu_2O$ particle-supported porous CuBTC with different meso-pore sizes synthesized in Examples 1, 4, 7, and 8 of the present invention.

From FIG. 3, the pore size of the $Cu_2O$ particle-supported porous CuBTC can be readily adjusted by changing the addition ratio of salicylic acid; from curves of CuBTC (2) and CuBTC (1.5) in FIG. 3, an increase in salicylic acid reduces the defect of decreased pore volume caused by enlargement of the pore size of the synthesized CuBTC, i.e., decreased adsorption rate.

Figure 4:
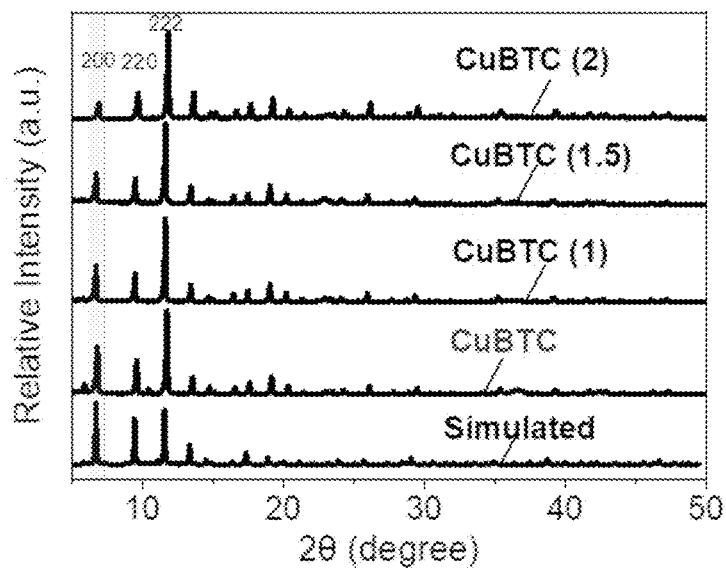
FIG. 4 illustrates X-ray diffraction (XRD) patterns of the $Cu_2O$ particle-supported porous CuBTC with different meso-pore sizes synthesized in Examples 1, 4, 7, and 8 of the present invention.

From FIG. 4, each of the $Cu_2O$ particle-supported porous CuBTC synthesized in Examples 1, 4, 7, and 8 of the present invention has the same peak in the XRD patterns, suggesting that crystallinity is retained. Intensities of main diffraction peaks (220) and (222) remain substantially unchanged (JCPDS: 00-062-1183). Specifically, as the addition of salicylic acid increases, the intensity of peak (200) weakens gradually, suggesting that defects originate from the crystal plane of (200).

For the purposes of promoting an understanding of the principles of the invention, specific embodiments have been described. It should nevertheless be understood that the description is intended to be illustrative and not restrictive in character, and that no limitation of the scope of the invention is intended. Any alterations and further modifications in the described components, elements, processes or devices and any further applications of the principles of the invention as described herein, are contemplated as would normally occur to one skilled in the art to which the invention pertains.

What is claimed is:

1. A method for assembling and synthesizing $Cu_2O$ particle-supported porous CuBTC, comprising the following steps of:
   1) dissolving 1.4-1.6 g of polyvinylpyrrolidone (PVP) in an ethanol solution to obtain a PVP-ethanol solution;
   2) dissolving 2.1-2.2 g of a copper salt in distilled water to obtain a copper salt solution, and mixing the copper salt solution with 0.6-0.7 g of trimesic acid, greater than 0 g to 0.9 g of salicylic acid, and the PVP-ethanol solution obtained in step 1) under stirring to obtain a mixed solution; and
   3) conducting a hydrothermal reaction on the mixed solution obtained in step 2) at 120° C. to obtain $Cu_2O$ particle-supported porous CuBTC.

2. The method for assembling and synthesizing the $Cu_2O$ particle-supported porous CuBTC according to claim 1, wherein in the hydrothermal reaction in step 3), 0.5-1.5 g of citric acid is dissolved in distilled water to obtain a 0.5-1.5 M citric acid solution;
   the citric acid solution is mixed with the mixed solution obtained in step 2) under stirring for 0.5-1 h to obtain a mixture, and then the mixture is transferred into a 100 ml hydrothermal reactor; the hydrothermal reactor is sealed and placed in an oven for the hydrothermal reaction at 120° C.

3. The method for assembling and synthesizing the $Cu_2O$ particle-supported porous CuBTC according to claim 1, wherein in the hydrothermal reaction in step 3), 1-2 g of tartaric acid is dissolved in distilled water to obtain a 1-2 M tartaric acid solution; the tartaric acid solution is mixed with the mixed solution obtained in step 2) under stirring for 0.5-1 h to obtain a mixture, and then the mixture is transferred into a 100 ml hydrothermal reactor; the hydrothermal reactor is sealed and placed in an oven for the hydrothermal reaction at 120° C.

4. The method for assembling and synthesizing the $Cu_2O$ particle-supported porous CuBTC according to claim 1, wherein a mass of the salicylic acid is 0.4-0.5 g.

5. The method for assembling and synthesizing the $Cu_2O$ particle-supported porous CuBTC according to claim 1, wherein a mass of the salicylic acid is 0.7-0.8 g.

6. The method for assembling and synthesizing the $Cu_2O$ particle-supported porous CuBTC according to claim 1, wherein a mass of the salicylic acid is 0.8-0.9 g.

7. The method for assembling and synthesizing the $Cu_2O$ particle-supported porous CuBTC according to claim 1, wherein the copper salt is $Cu(NO_3)_2.3H_2O$.

8. The method for assembling and synthesizing the $Cu_2O$ particle-supported porous CuBTC according to claim 1, wherein a molar ratio of the ethanol solution in step 1) to the distilled water in step 2) is 1:1.

9. The method for assembling and synthesizing the $Cu_2O$ particle-supported porous CuBTC according to 1, wherein both the ethanol solution in step 1) and the distilled water in step 2) are 30 ml in volume.

10. The method for assembling and synthesizing the $Cu_2O$ particle-supported porous CuBTC according to 1, wherein the hydrothermal reaction in step 3) lasts for 12 h.

11. The method for assembling and synthesizing the $Cu_2O$ particle-supported porous CuBTC according to claim 2, wherein a mass of the salicylic acid is 0.4-0.5 g.

12. The method for assembling and synthesizing the $Cu_2O$ particle-supported porous CuBTC according to claim 3, wherein a mass of the salicylic acid is 0.4-0.5 g.

13. The method for assembling and synthesizing the $Cu_2O$ particle-supported porous CuBTC according to claim 2, wherein a mass of the salicylic acid is 0.7-0.8 g.

14. The method for assembling and synthesizing the $Cu_2O$ particle-supported porous CuBTC according to claim 3, wherein a mass of the salicylic acid is 0.7-0.8 g.

15. The method for assembling and synthesizing the $Cu_2O$ particle-supported porous CuBTC according to claim 2, wherein a mass of the salicylic acid is 0.8-0.9 g.

16. The method for assembling and synthesizing the $Cu_2O$ particle-supported porous CuBTC according to claim 3, wherein a mass of the salicylic acid is 0.8-0.9 g.

17. The method for assembling and synthesizing the $Cu_2O$ particle-supported porous CuBTC according to claim 2, wherein the copper salt is $Cu(NO_3)_2.3H_2O$.

18. The method for assembling and synthesizing the $Cu_2O$ particle-supported porous CuBTC according to claim 3, wherein the copper salt is $Cu(NO_3)_2.3H_2O$.

19. The method for assembling and synthesizing the $Cu_2O$ particle-supported porous CuBTC according to claim 2, wherein a molar ratio of the ethanol solution in step 1) to the distilled water in step 2) is 1:1.

20. The method for assembling and synthesizing the $Cu_2O$ particle-supported porous CuBTC according to claim 3, wherein a molar ratio of the ethanol solution in step 1) to the distilled water in step 2) is 1:1.

* * * * *